Patented July 3, 1934

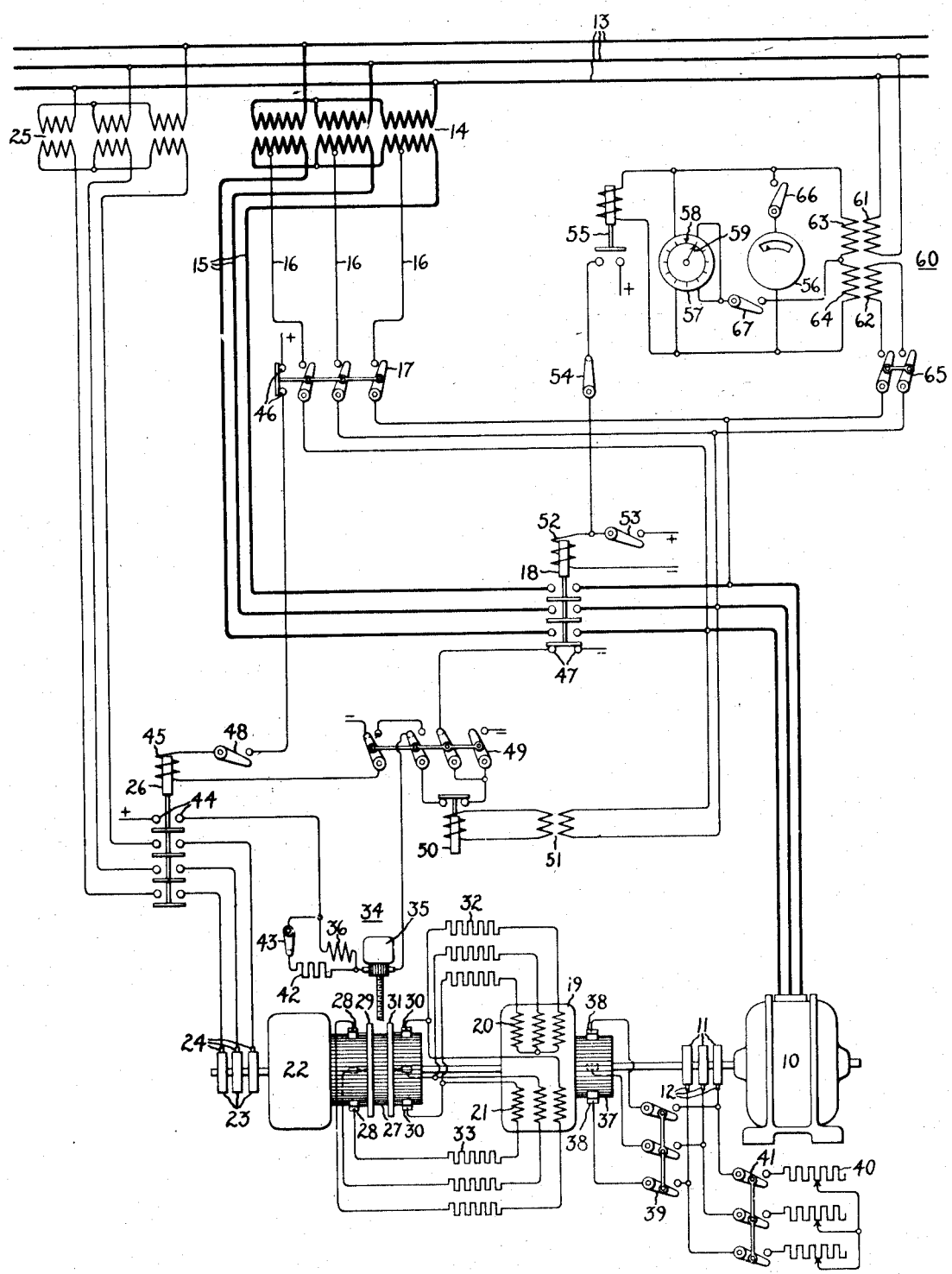

1,965,432

UNITED STATES PATENT OFFICE 1,965,432

METHOD OF AND APPARATUS FOR CONTROLLING ASYNCHRONOUS DYNAMO-ELECTRIC MACHINES

Percy W. Robinson, Scotia, N. Y., assignor to General Electric Company, a corporation of New York Application July 26, 1933, Serial No. 682,252

16 Claims. (Cl. 171—118)

My invention, in its broad aspect, relates to a method of and an apparatus for inducing an alternating voltage of a predetermined magnitude and phase in the primary winding of a wound secondary induction motor rotating at other than its synchronous speed without its primary winding being energized. At present, I believe that the most important practical application of my invention is for starting the operation of a wound secondary induction motor from an alternating current source with an acceptable transient current surge in the motor primary winding when the latter is connected to this source. However, from the description hereinafter given of my invention, it will be apparent that other advantageous uses thereof may be made and, therefore, I wish it clearly understood that my invention is not limited to the application thereof to be described for the purpose of explaining the same.

In the United States Patents Nos. 1,814,810 and 1,853,004, both issued to Jump and assigned to the assignee of this application, there are disclosed arrangements of apparatus for starting the operation of a wound secondary induction motor from an alternating current source with an acceptable transient current surge in the motor primary winding when the latter is connected to the source. This limiting of the transient current surge to an acceptable value results in important advantages to the motor and to the alternating current source which are well known to those skilled in this art and which, therefore, will not be described herein. In each of the arrangements described in the above mentioned patents, however, a starting motor is employed for starting the induction motor and accelerating it approximately to its synchronous speed. While the induction motor is being driven at approximately its synchronous speed by the starting motor, the secondary winding of the induction motor is suitably energized with slip frequency currents from commutator type regulating apparatus to produce a safe interconnecting vector difference between the voltage induced in the induction motor primary winding and the voltage of the alternating current source, and then the primary winding is connected to the source. This safe interconnecting vector difference is of a sufficiently low value to limit to an acceptable value the transient current surge in the primary winding when the latter is connected to the source. The use of a starting motor, however, involves considerable additional expense and complications. My invention, however, makes it possible to obtain the above described desired result without employing a starting motor and without requiring larger capacity commutator type regulating apparatus than that necessary for the normal operation of the induction motor.

Briefly described, the salient features of my invention consist in impressing on the induction motor primary winding an alternating voltage whose magnitude is materially lower than the normal operating voltage of the motor for starting the latter and accelerating it approximately to its synchronous speed, removing the subnormal alternating voltage impressed on the primary winding when the motor is running at approximately its synchronous speed, and, while the motor is decelerating, suddenly impressing on the motor secondary winding a very rapidly increasing slip frequency voltage of suitable phase, or suddenly impressing on this winding a slip frequency voltage of predetermined magnitude and phase to produce in either case a transient magnetizing flux of such magnitude and phase in the motor during the transient period immediately following the initial impressing of slip frequency voltage on the secondary winding that during some portion of this period there is induced in the motor primary winding a voltage whose magnitude and phase are such that the vector difference between this voltage and that of the source from which the motor is to operate normally will not exceed a predetermined value, and then impressing the voltage of this source on the motor primary winding at sometime during the transient period when this predetermined vector difference is not exceeded.

My invention, however, will be best understood from the following description when considered in connection with the accompanying drawing, while those features of my invention which are believed to be novel and patentable are pointed out in the appended claims.

The single figure of the drawing diagrammatically represents a preferred embodiment of my invention. In this figure, 10 represents a wound secondary induction motor whose operation is to be started from an alternating current source having a voltage substantially equal to the normal operating voltage of the motor with an acceptable transient current surge in the motor primary winding when the latter is connected to this source. For the sake of simplicity I will assume that this motor has a stationary primary winding, and has a rotatable secondary winding connected to collector rings 11 on which rest stationary brushes 12. An alternating current source, represented by 13, has connected thereto the primary windings of a transformer 14. The secondary windings of this transformer are connected in star and the terminals of these windings are connected to leads 15, hence it is clear that substantially the full voltage induced in the secondary windings will exist between these leads. I will assume that the voltage between any two leads 15 is substantially equal to the normal operating voltage of motor 10. In accordance with my invention I start and accelerate motor 10 to approximately its synchronous speed by first connecting it to an alternating current source whose voltage is materially lower than the normal operating voltage of the motor, the value of this materially lower voltage being such as to limit to an acceptable value the inrush current to the motor primary winding. Any suitable means may be employed for supplying this materially lower voltage. For the sake of simplicity I have shown this materially lower voltage obtainable from intermediate taps on the secondary winding of transformer 14, these taps being connected to leads 16. The primary winding of motor 10 may be connected to leads 16 for starting by closing a manually operated switch 17, or the primary winding may be connected to leads 15 for running by closing an electromagnetically operated switch 18. It is therefore clear that when switch 17 is closed an alternating voltage materially lower than the normal operating voltage of the motor is impressed on its primary winding, whereas when switch 18 is closed the normal operating voltage of the motor is impressed on its primary winding.

For energizing the secondary winding of motor 10 with slip frequency currents during the starting operation, I prefer to employ a commutator regulating machine 19 having two stationary exciting windings 20 and 21 energized by a commutator type frequency changer 22, the rotatable elements of these machines being shown for the sake of simplicity as mounted on or secured to the shaft of motor 10. Frequency changer 22 has a rotatable armature winding connected to collector rings 23 on which rest stationary brushes 24, and this winding may be energized from source 13 through a transformer 25 by closing an electromagnetically operated switch 26. The above mentioned armature winding of frequency changer 22, or another rotatable armature winding inductively related therewith, is connected to a rotatable commutator 27 on which rest two sets of brushes. One set consists of three circumferentially spaced apart brushes represented by 28 which are carried by a movable brush holder 29, and the other set consists of three circumferentially spaced apart brushes represented by 30 which are carried by a movable brush holder 31. Exciting winding 20 of regulating machine 19 is connected in series with a resistance 32 across brushes 30 of frequency changer 22, and exciting winding 21 is connected in series with a resistance 33 across brushes 28 and 30. It is clear that by suitably shifting brush holders 29 and 31 the time phase and magnitude of the voltage impressed on exciting winding 21 can be controlled, whereas only the time phase of the voltage impressed on exciting winding 20 can be controlled. These brush holders are adapted to be shifted by a direct current series type pilot motor 34 having a rotatable armature winding 35 and a series exciting winding 36. Any suitable mechanism may be interposed between the shaft of motor 34 and brush holders 29 and 31 for shifting the latter in the desired manner. An example of such a mechanism is illustrated in Figs. 2, 3 and 4 of United States Patent No. 1,778,599, issued to myself and John I. Hull on October 14, 1930, and assigned to the assignee of this application. Regulating machine 19 has a rotatable armature winding connected to a commutator 37 on which rest three circumferentially spaced apart stationary brushes 38 which may be connected to the secondary winding of motor 10 by closing a switch 39. This secondary winding may also be connected in series with an adjustable resistance 40 by closing a switch 41. Motor 10 may be used for any purpose, for example as one element of a two unit frequency converter set as shown in the previously mentioned Patents Nos. 1,778,599 and 1,853,004. When motor 10 is so used, the commutator brushes on frequency changer 22 are shifted during normal operation at a much lower rate than they should be shifted in accordance with my invention during the starting operation of the motor, and, therefore, I have shown a resistance 42 connected in series with a switch 43 across exciting winding 36 of pilot motor 34. During normal operation of motor 10 switch 43 is open and pilot motor 34 will operate at its normal speed when energized, whereas during the starting operation of motor 10 switch 43 is closed to shunt sufficient current from armature winding 35 of the pilot motor through resistance 42 to cause the pilot motor to operate at much higher than its normal speed when energized.

Switch 26 has an auxiliary pair of normally open contacts 44 and an operating coil 45; switch 17 has an auxiliary pair of normally closed contacts 46; and switch 18 has an auxiliary pair of normally closed contacts 47. One end of coil 45 is connected to one side of a suitable control current source in series with a normally open switch 48 and auxiliary contacts 46 of switch 17. The other end of coil 45 is directly connected to the other side of the control source through a switch 49 when the latter is closed to the left, as shown, or is connected to the other side of this control source through switch 49 and the normally closed contacts of a relay 50 when this switch is closed to the right. Relay 50 is energized by the voltage induced in the primary winding of motor 10 during the starting operation by having the relay coil energized by the secondary winding of a transformer 51 whose primary winding is connected across two of the motor primary winding terminal leads. One terminal of motor 34 is connected to one side of the control current source in series with the normally open auxiliary contacts 44 of switch 26. The other terminal of motor 34 is connected to the other side of this control current source in series with switch 49, contacts of relay 50, and contacts 47 of switch 18 when switch 49 is closed to the left, as shown, or is disconnected from the other side of this control source when switch 49 is closed to the right.

Switch 18 has an operating coil 52 one end of which is directly connected to one side of the control source, and the other end of which may be connected to the other side of this control source by closing a manually operated normally open switch 53, or may be connected to the other side of this control source in series with a normally closed switch 54 by the closing of the normally open contacts of a relay 55. The object of switch 53 is to enable the energization of coil 52 of switch 18 to be effected manually when suitable indicating mechanisms, hereinafter described, indicate that the voltage induced in the primary winding of motor 10 during the starting operation and the voltage of source 13 are substantially in time phase opposition and that the vector difference between these voltages does not exceed a predetermined value, whereas the object of relay 55 is automatically to effect the energization of coil 52 when the above described condition exists with respect to these voltages. The above mentioned indicating mechanisms consist of an indicating voltmeter 56 and an indicating synchroscope 57 having a stationary dial with a prominent mark at its top represented by 58 and a rotatable pointer 59. For energizing voltmeter 56 in accordance with the vector difference between the voltage induced in the primary winding of motor 10 during the starting operation and the voltage of source 13, I provide a transformer 60 having two primary windings 61 and 62 and two secondary windings 63 and 64 inductively related to primary windings 61 and 62, respectively. Primary winding 61 is connected to the two lower lines of source 13, and primary winding 62 is connected in series with a normally open switch 65 to those two leads coming from the primary winding of motor 10 that will be energized from the two lower lines of source 13 during normal operation of the motor. Secondary windings 63 and 64 of transformer 60 are connected in series opposition, and the terminals of these windings are connected to the operating coil of relay 55, and are also connected in series with a normally open switch 66 to the voltmeter 56. Synchroscope 57 is connected in series with a normally open switch 67 to secondary windings 63 and 64 so that its pointer 59 will be stationary and point to mark 58 when the voltage induced in the primary winding of motor 10 during the starting operation and the voltage of source 13 are substantially in time phase opposition, whereas its pointer 59 will indicate to one side or the other of mark 58 when these voltages are not so related.

There are four principal methods of operating the above described apparatus during the starting operation of motor 10, viz., (1) automatic synchronization of motor 10 with rapid shifting of frequency changer commutator brushes; (2) manual synchronization of motor 10 with rapid shifting of frequency changer commutator brushes; (3) automatic synchronization of motor 10 with frequency changer commutator brushes in a fixed predetermined position; and (4) manual synchronization of motor 10 with frequency changer commutator brushes in a fixed predetermined position. These four methods will now be described in the order named:

*1. Automatic synchronization of motor 10 with rapid shifting of frequency changer commutator brushes.*—First assume that all the switches are in their illustrated positions. The contacts of relay 50 will be closed because no voltage is now being induced in the primary winding of motor 10, whereas the contacts of relay 55 will be open because the operating coil of this relay is energized from source 13 through windings 61 and 63 of transformer 60. Since the contacts of relay 55 are open, the operating coil of switch 18 will be disconnected from the control current source, hence this switch will be open. This method of operation is commenced by closing switch 41 and then closing switch 17, thus impressing on the primary winding of motor 10 a voltage materially lower than the normal motor operating voltage. The motor therefore starts with an acceptable transient surge current in its primary winding. The closing of switch 17 also opens its auxiliary contacts 46. While the motor is accelerating, switches 48 and 65 are closed. The motor is then brought approximately to its synchronous speed by gradually short-circuiting resistances 40, and when this has been done switch 39 is closed, switch 41 is opened, and then switch 17 is opened. The opening of switch 17 disconnects the primary winding of motor 10 from the starting taps of transformer 14, hence the motor starts to decelerate. The opening of switch 17, however, also closes its auxiliary contacts 46, thus effecting the energization of coil 45 of switch 26 (switch 48 being previously closed) and switch 26 therefore closes. The closing of switch 26 closes its auxiliary contacts 44, thus effecting the energization of pilot motor 34 from the control current source, and also effects the energization of frequency changer 22 from source 13. Brush holders 29 and 31 are preferably so adjusted that at the instant switch 26 is closed substantially no voltage is impressed on exciting windings 21 of regulating machine 19. This is accomplished by adjusting these brush holders before motor 10 is started so that every two commutator brushes carried by these brush holders that are connected to the opposite ends of any one phase of exciting winding 21 will rest on substantially the same commutator bar. The closing of switch 26, therefore, causes slip frequency voltage to be suddenly impressed only on exciting windings 20 and also immediately starts rotation of pilot motor 34. It is well known to those skilled in the art that when a polyphase alternating voltage is suddenly impressed on an unexcited polyphase winding surrounding a magnetic core the steady state value of alternating flux does not result immediately, but that a transient flux much in excess of the steady state value is produced during the first half cycle of the impressed voltage and this flux decreases to its steady state value at the end of a few cycles. Consequently, the closing of switch 26 suddenly impresses a voltage on exciting winding 20, thus producing in regulating machine 19 a transient magnetizing force considerably in excess of its steady state value. This in turn causes the regulating machine to impress suddenly a transient slip frequency voltage considerably in excess of its steady state value on the secondary winding of motor 10, thus producing therein a transient magnetizing flux considerably in excess of its steady state value. However, by selection of a suitable ohmic value of resistance 32 and suitable constants for exciting winding 20, the transient magnetizing flux in motor 10, due only to the sudden impressing of voltage on this exciting winding, is insufficient to induce in the motor primary winding a voltage of such a magnitude that the vector difference between this voltage and that of source 13 does not exceed a predetermined value which is low enough to limit to an acceptable value the current surge in the primary winding if switch 18 were closed when this vector difference voltage exists. This safe interconnecting vector difference voltage is, however, obtained during the transient period immediately following the closing of switch 26 by supplementing the transient magnetizing force produced in regulating machine 19 by the sudden impressing of voltage on exciting winding 20 with another transient magnetizing force in this machine produced by rapidly shifting the commutator brushes of frequency changer 22 immediately after switch 26 is closed so as to impress a rapidly increasing voltage on exciting winding 21.

The mechanism interposed between the shaft of pilot motor 34 and brush holders 28 and 30 is so arranged and the ohmic value of field shunting resistance 42 is so selected that immediately after the closing of switch 26 the brush holders 28 and 30 will be shifted at such a rapid rate and in such a manner that the voltage impressed on exciting windings 21 will be continuously increased at a high enough rate to compensate for the time constants of the electrical and magnetic circuits of regulating machine 19 and motor 10. This produces in machine 19 during the transient period immediately following the closing of switch 26 a sufficiently large transient magnetizing force, which in conjunction with the transient magnetizing force in machine 19 due to the sudden impressing of voltage on exciting winding 20 during this transient period, as previously described, causes regulating machine 19 to produce in motor 10 a sufficiently large transient magnetizing flux to induce in the motor primary winding during this transient period a voltage of such a magnitude and time phase that the vector difference between this voltage and that of source 13 does not exceed a predetermined value. This predetermined vector difference is sufficiently low to limit to an acceptable value the current surge in the primary winding of motor 10 if switch 18 is closed when this vector difference is not exceeded. However, during the transient period immediately following the closing of switch 26, the voltage impressed on the operating coil of relay 55 is the vector difference between the voltage of source 13 and the voltage induced in the primary winding of motor 10. This relay is so arranged that when the voltage impressed on its operating coil does not exceed the previously mentioned safe interconnecting vector difference the energization of the operating coil will be sufficiently decreased so that the movable member of the relay will drop and close its contacts. Consequently, as soon as the voltage induced in the primary winding of motor 10 has been increased sufficiently during this transient period to produce the previously mentioned safe interconnecting vector difference between this induced voltage and that of source 13 the relay 55 will automatically close its contacts. The closing of the contacts of relay 55 effects the energization of operating coil 52 of switch 18, thus causing this switch to close and thereby place motor 10 in operation from source 13 with the normal operating voltage of the motor impressed on its primary winding. The previously mentioned safe interconnecting vector voltage difference may form an appreciable percentage of the normal operating voltage of the motor. Consequently, during a substantial portion of a half cycle of the slip frequency voltage impressed on the secondary winding of motor 10 the vector difference between the voltage induced in the primary winding of this motor and the voltage of source 13 will not exceed the above mentioned safe interconnecting value. Since one half of a slip frequency cycle will ordinarily last several seconds, for reasons explained later, there will be sufficient time for relay 55 and switch 18 to operate in the manner described. The closing of switch 18 opens its auxiliary contacts 47 and thus disconnects motor 34 from the control current source, thus causing this motor to cease rotating. Switch 26 remains closed because switch 17 is left open, and switch 18 remains closed because the contacts of relay 55 remain closed since substantially zero voltage is impressed on its operating coil after switch 18 is closed; hence motor 10 is ready for its normal operation. Relay 55 and switch 18 are constructed to be sufficiently quick acting to operate as described during the transient period immediately following the closing of switch 26. It should now be clear that I have provided an arrangement which does not employ a starting motor for motor 10, but which, nevertheless, places motor 10 in operation from its normal voltage source with an acceptable transient current surge in the motor primary winding.

If during the previously described operation switch 18 should for any reason fail to close automatically the first time that the previously mentioned safe interconnecting vector difference exists between the voltage of source 13 and the voltage induced in the primary winding of motor 10, then pilot motor 34 will continue to rotate, thereby increasing the voltage induced in the primary winding of motor 10. However, when the voltage induced in the primary winding of motor 10 has been increased to a value materially in excess of the normal operating voltage of the motor the relay 50 will open its contacts, since this relay is so arranged that when this materially higher than normal operating voltage is induced in the motor primary winding the energization of the relay coil is sufficiently increased to open its contacts. The opening of the contacts of relay 50 disconnects pilot motor 34 from the control current source, thus almost immediately stopping the shifting of brush holders 28 and 30. This causes the voltage induced in the primary winding of motor 10 to decrease, because the motor is decelerating and this increases the frequency of the voltage impressed on the secondary winding of motor 10, and this in turn decreases the flux which can be produced in the motor by a given voltage impressed on its secondary winding. Furthermore, the flux produced in regulating machine 19, and, therefore, its generated voltage, is reduced by this increased frequency, because the counter-voltage generated by a given amount of flux in exciting windings 20 and 21 is practically directly proportional to the frequency of the voltages impressed thereon. The result is that the voltage induced in the primary winding of motor 10 rapidly decreases after relay 50 opens its contacts. When the voltage induced in the primary winding of motor 10 has decreased to approximately the normal operating voltage of the motor, or, preferably, to somewhat below this normal operating voltage, then relay 50 will reclose its contacts, thus again starting rotation of pilot motor 34. Assuming that the previously mentioned failure of switch 18 to close was not due to an inoperative condition of this switch or of relay 55, then the resumption of rotation of pilot motor 34 should cause another transient magnetizing flux in motor 10, which should produce the previously mentioned safe interconnecting vector difference between the voltage of source 13 and the voltage induced in the primary winding of motor 10, and, therefore, switch 18 should close when this vector difference exists for the second time. With the above assumption regarding the operative condition of relay 55 and switch 18, the latter will practically always close when the previously mentioned safe interconnecting vector voltage difference occurs for the first time, and should surely close when this vector voltage difference occurs for the second time. Relay 50 is constructed to be sufficiently quick acting to operate as described during the transient period previously mentioned. It should therefore be clear that relay 50 prevents dangerously high voltages from being induced in the primary winding of motor 10 and yet automatically restarts the rotation of pilot motor 34 so as to give switch 18 one or more additional opportunities to close when the safe interconnecting vector voltage difference again occurs.

*2. Manual synchronization of motor 10 with rapid shifting of frequency changer commutator brushes.*—Assume that all switches are in their illustrated positions. To operate under this method switch 54 should be opened and switches 66 and 67 should be closed. This method of operation is then commenced in the same manner as that described under Number 1 method, and the operation under Number 2 method will be similar to that described in Number 1 method, except that switch 18 will be closed manually instead of automatically. Thus, as soon as the operator opens switch 17 after motor 10 is running at approximately its synchronous speed, he watches voltmeter 56 and synchroscope 57, and when the voltmeter indicates that the vector difference between the voltage of source 13 and the voltage induced in the primary winding of motor 10 is equal to or less than the previously mentioned safe interconnecting vector voltage difference, and pointer 59 of the synchroscope simultaneously points at or substantially at the mark 58, then the operator closes switches 53, thus effecting the closing of switch 18. The operator will have sufficient time to watch the voltmeter and synchroscope and manually close switch 53 at the proper time during the transient period immediately following the opening of switch 17 and the closing of switch 26, because this transient period will ordinarily last several seconds since the motor is brought nearly to its synchronous speed before switch 17 is opened, so that the frequencies of the voltage impressed on the motor secondary winding during this transient period are very low. Thus, for example, if the frequency of system 13 is 60 cycles per second and the running light slip of motor 10 is .1%, then the slip frequency will be .06 cycles per second, which corresponds to slightly over 8 seconds for one half of a slip frequency cycle. Hence, the first half of a slip frequency cycle immediately following the closing of switch 26 should last slightly over 8 seconds. During this 8 seconds period immediately following the closing of switch 26 the brushes 28 and 30 are shifted so rapidly that there is produced at sometime during this period the previously mentioned safe interconnecting vector difference between the voltage induced in the primary winding of the motor 10 and the voltage of system 13, and at the same time this period of 8 seconds gives the operator ample time to watch instruments 56 and 57 and manually close switch 53 at the proper time.

*3. Automatic synchronization of motor 10 with frequency changer commutator brushes in fixed predetermined position.*—Assume that all switches are in their illustrated positions. To operate under this method switch 49 should be closed to the right. This disconnects pilot motor 34 from the negative side of the control current source so that the closing of contacts 44 on switch 26 cannot effect the energization of this motor. Also, the operating coil 45 of switch 44 instead of being connected directly through switch 49 to the negative side of the control current source will now be connected to the negative side through switch 49 and the contacts of relay 50. This method of operation is commenced in the same way as described under Number 1 method. However, since brushes 28 and 30 of frequency changer 22 are not to be shifted under this method of starting the operation of motor 10, the brush holders 29 and 31 are so adjusted that at the instant switch 26 closes in response to the opening of switch 17 when the motor has been accelerated to nearly its synchronous speed, the voltage suddenly impressed on exciting windings 20 and 21 of regulating machine 19 will be of the proper magnitudes and time phases to produce a transient magnetizing flux in this machine that will cause the latter to impress suddenly on the secondary winding of motor 10 a slip frequency voltage of such magnitude and time phase as to produce therein a transient magnetizing flux that will induce in the primary winding of the motor at sometime during the transient period immediately following the closing of switch 26 a voltage whose magnitude is such that the vector difference between this induced voltage and that of source 13 will not exceed the previously mentioned safe interconnecting vector voltage difference. At the instant the vector difference between the voltage induced in the primary winding of motor 10 is equal to or less than this safe interconnecting vector difference, relay 55 will automatically close its contacts, thus effecting the energization of coil 52 of switch 18, and this switch closes. Motor 10 is therefore now placed in operation from some source 13 with the normal operating voltage of the motor impressed on its primary winding.

If, during the above described operation, switch 18 should for any reason fail to close automatically the first time when the previously mentioned safe interconnecting vector difference exists between the voltage of source 13 and the voltage induced in the primary winding of motor 10 and this induced voltage should increase to a value materially in excess of the normal operating voltage of the motor, then relay 50 will open its contacts. This will effect the deenergization of coil 45 of switch 26 and this switch will open. Frequency changer 22 will therefore become deenergized and the voltage induced in the primary winding of motor 10 will rapidly decrease. When this induced voltage has decreased to approximately the normal operating voltage of the motor, or preferably somewhat below this normal operating voltage, then relay 50 will reclose its contacts, thus effecting energization of coil 45 of switch 26 and this switch recloses. This again suddenly impresses voltages on exciting windings 20 and 21 of regulating machine 19 which should once more produce the previously mentioned safe interconnecting vector difference between the voltage induced in the primary winding of motor 10 and the voltage of source 13. Assuming that the previously mentioned failure of switch 18 to close was not due to an inoperative condition of this switch or of relay 55, then this switch should close when the safe interconnecting vector voltage difference exists for the second time. If, however, switch 18 should again fail to close and the induced voltage should again increase to a value materially in excess of the normal operating voltage of motor 10, then relay 50 will again open its contacts and the previously described operation will be repeated until switch 18 closes. With the above assumption regarding the operative condition of relay 55 and switch 18, the latter will practically always close when the previously mentioned safe interconnecting vector voltage difference occurs for the first time, and should surely close when this vector voltage difference occurs for the second time. It should therefore be clear that relay 50 prevents dangerously high voltages from being induced in the primary winding of motor 10 and yet automatically effects the reenergization of frequency changer 22 so as to give switch 18 one or more additional opportunities to close when the safe interconnecting vector voltage difference again occurs.

4. *Manual synchronization of motor 10 with frequency changer commutator brushes in a fixed predetermined position.*—Assume that all switches are in their illustrated positions. To operate under this method switch 49 should be closed to the right, switch 54 should be opened, switches 66 and 67 should be closed, and brush holders 29 and 31 should be adjusted as described with Number 3 method. This Number 4 method of operation is commenced in the same manner as that described under Number 1 method, and the operation will be similar to that described under Number 3 method, except that switch 18 will be closed manually instead of automatically. Thus, as soon as the operator opens switch 17 after motor 10 is running at approximately its synchronous speed, he watches voltmeter 56 and synchroscope 57 and when the voltmeter indicates that the vector difference between the voltage of source 13 and the voltage induced in the primary winding of motor 10 is equal to or less than the previously mentioned safe interconnecting vector voltage difference and pointer 59 of the synchroscope simultaneously points at or substantially at the mark 58, then the operator closes switch 53, thus effecting the closing of switch 18.

Although under Numbers 1 and 2 methods of operation I have described a rapid shifting of commutator brushes 28 and 30 of frequency changer 22 with these brushes initially positioned to impress substantially no voltage on exciting winding 21 of regulating machine 19 at the instant switch 26 is closed, whereas under Numbers 3 and 4 methods of operation I have described brushes 28 and 30 as being in a fixed predetermined position to produce without shifting thereof the safe interconnecting vector difference between the voltage of source 13 and the voltage induced in the primary winding of motor 10, yet it will be obvious that my invention is not limited to these methods of operation, since any presetting of the commutator brushes may be employed between the two extreme settings described. Thus, for example, the commutator brushes may be preset so that at the instant switch 26 is closed voltages will be impressed both on exciting winding 20 and 21, but these voltages will be insufficient to produce the safe interconnecting vector difference between the voltage of source 13 and the voltage induced in the primary winding of motor 10, and then the brushes will be rapidly shifted to produce this vector difference.

Furthermore, although under Numbers 1 and 3 methods of operation I have described a completely automatic operation of the apparatus after switch 17 is manually opened, whereas under methods 2 and 4 I have described a partly automatic operation of the apparatus after this switch is manually opened, yet it will be obvious that my invention is not limited to these methods, since my invention may be practiced with manual operation of all the switches. Thus, for example, assuming that switch 26 is a manually operable switch, the motor is brought to substantially its synchronous speed in the manner described, switch 17 is manually opened, then switch 26 is manually closed, and then the operator closes switch 53 at the proper time as described under Numbers 2 and 4 methods of operation, it being assumed, of course, that switch 54 is open and switches 65, 66 and 67 have been previously closed.

It should now be obvious that my invention provides an arrangement of apparatus which does not employ a starting motor for motor 10, but which, nevertheless, may be operated in any of several different ways to place the motor in operation from its normal operating voltage source with an acceptable transient current surge in its primary winding. This choice in operation of my arrangement enables it to be used under widely varying conditions and yet be operated in a manner that will produce the optimum result in each particular case. Furthermore, since during the transient period immediately following the closing of switch 26 transient magnetizing fluxes in regulating machine 19 and motor 10 are built up much more quickly than steady state fluxes of the same values could be established, I can employ comparatively small machines for frequency changer 22 and regulating machine 19 when these are to be used only for placing motor 10 into normal operation in accordance with my invention. The reason for this is that the reduction of time required to build up a given flux and resultant voltage in machine 19 allows less time for machine 10 to slow down, and, therefore, the slip frequency and required voltage from machine 19 are less than would be the case if steady state fluxes were employed. If, however, these machines are to be used for regulating purposes after motor 10 is in normal operation, then ordinarily they need not be made any larger than necessary to perform their regulating functions in order to use them also for placing motor 10 into normal operation in accordance with my invention.

In accordance with the provisions of the patent statutes, I have described the principles of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is:

1. In combination, an induction motor having relatively rotatable primary and secondary windings, a switch for connecting said primary winding to an alternating current source having the normal operating voltage of the motor, said motor rotating at a speed other than its synchronous speed while said switch is open, means for supplying an alternating voltage whose frequency equals the slip frequency of said rotating motor, means for connecting said slip frequency voltage supplying means to said secondary winding, a switch so connected that the closing thereof causes said slip frequency voltage producing means to impress a slip frequency voltage on said secondary winding, said slip frequency voltage supplying means being arranged to impress on said secondary winding a slip frequency voltage whose magnitude and time phase during the transient period immediately following the closing of the last mentioned switch are such as to produce a safe interconnecting difference between the voltage induced in said primary winding and the voltage of said source at sometime during this transient period, and means responsive to the vector difference between the voltage induced in said primary winding and the voltage of said source for closing the first mentioned switch at sometime during the transient period when said safe interconnecting vector difference is not exceeded, the last mentioned means being sufficiently quick acting to effect this switch closing operation during said transient period.

2. In combination, an induction motor having relatively rotatable primary and secondary windings, a switch for connecting said primary winding to an alternating current source having the normal operating voltage of the motor, said motor rotating at a speed other than its synchronous speed while said switch is open, means for supplying an alternating voltage whose frequency equals the slip frequency of said rotating motor, connecting means between said slip frequency voltage supplying means and said secondary winding, a switch so connected that the closing thereof causes said slip frequency voltage producing means to impress a slip frequency voltage on said secondary winding, movable means for increasing the magnitude of the slip frequency voltage impressed on said secondary winding, means for effecting the operation of said movable means at such a rapid rate during the transient period immediately following the closing of the last mentioned switch as to produce a safe interconnecting vector difference between the voltage induced in said primary winding and the voltage of said source at sometime during this transient period, and means responsive to the vector difference between the voltage induced in said primary winding and the voltage of said source for closing the first mentioned switch at sometime during the transient period when said safe interconnecting vector difference is not exceeded, the last mentioned means being sufficiently quick acting to effect this switch closing operation during said transient period.

3. In combination, an induction motor having relatively rotatable primary and secondary windings, a switch for connecting said primary winding to an alternating current source whose voltage is substantially equal to the normal operating voltage of the motor, voltage reducing means connected to said source for supplying an alternating voltage materially lower than the normal operating voltage of said motor, a switch for connecting said primary winding to said voltage reducing means for starting and accelerating the motor approximately to its synchronous speed with an acceptable inrush current to said primary winding, commutator type frequency changing means interposed between said source and said secondary winding for impressing on the latter an alternating voltage whose frequency equals the slip frequency of said rotating motor, said frequency changing means having movable commutator brushes for varying the magnitude and time phase of the slip frequency voltage, and a switch so connected that the closing thereof causes said slip frequency voltage producing means to impress a slip frequency voltage on said secondary winding, said commutator brushes being so positioned that said frequency changing means impress on said secondary winding a slip frequency voltage whose magnitude and time phase during the transient period immediately following the closing of the third mentioned switch are such as to produce a safe interconnecting vector difference between the voltage induced in said primary winding and that of said source at sometime during this transient period while said motor is decelerating.

4. In combination, an induction motor having relatively rotatable primary and secondary windings, a switch for connecting said primary winding to an alternating current source whose voltage is substantially equal to the normal operating voltage of the motor, voltage reducing means connected to said source for supplying an alternating voltage materially lower than the normal operating voltage of said source, a switch for connecting said primary winding to said voltage reducing means for starting and accelerating the motor approximately to its synchronous speed with an acceptable inrush current to said primary winding, commutator type frequency changing means interposed between said source and said secondary winding for impressing on the latter an alternating voltage whose frequency equals the slip frequency of said rotating motor, said frequency changing means having movable commutator brushes for varying the magnitude and time phase of the slip frequency voltage, a switch so connected that the closing thereof causes said slip frequency voltage producing means to impress a slip frequency voltage on said secondary winding, and means for moving said commutator brushes at such a rapid rate during the transient period immediately following the closing of the third mentioned switch as to produce a safe interconnecting vector difference between the voltage induced in said primary winding and that of said source at sometime during this transient period while said motor is decelerating.

5. In combination, an induction motor having relatively rotatable primary and secondary windings, a switch for connecting said primary winding to an alternating current source whose voltage is substantially equal to the normal operating voltage of said motor, voltage reducing means connected to said source for supplying an alternating voltage materially lower than the normal operating voltage of said motor, a switch for connecting said primary winding to said voltage reducing means for starting and accelerating the motor approximately to its synchronous speed with an acceptable inrush current to said primary winding, a commutator type frequency changer energized from said source for delivering an alternating voltage whose frequency equals the slip frequency of said rotating motor, said frequency changer having commutator brushes, a commutator type regulating machine having exciting windings connected to said commutator brushes, connecting means between said regulating machine and said secondary winding, a switch interposed between said frequency changer and said source, means responsive to the opening of the second mentioned switch for closing the third mentioned switch, said commutator brushes being so positioned that said regulating machine impresses on said secondary winding a slip frequency voltage whose magnitude and time phase during the transient period immediately following the closing of the third mentioned switch are such as to produce a safe interconnecting vector difference between the voltage induced in said primary winding and that of said source at sometime during this transient period while said motor is decelerating, and means responsive to the vector difference between the voltage induced in said primary winding and that of said source for closing the first mentioned switch at sometime during the transient period when said safe interconnecting vector difference is not exceeded, the last mentioned means being sufficiently quick acting to effect this switch closing operation during said transient period.

6. In combination, an induction motor having relatively rotatable primary and secondary windings, a switch for connecting said primary winding to an alternating current source whose voltage is substantially equal to the normal operating voltage of said motor, voltage reducing means connected to said source, a switch for connecting said primary winding to said voltage reducing means for starting and accelerating the motor approximately to its synchronous speed with an acceptable inrush current to said primary winding, a commutator type frequency changer energized from said source for delivering an alternating voltage whose frequency equals the slip frequency of said motor, said frequency changer having movable commutator brushes, a commutator type regulating machine having exciting windings connected to said commutator brushes, connecting means between said regulating machine and said secondary winding, a switch interposed between said frequency changer and said source, means for moving said commutator brushes to increase the magnitude of the slip frequency voltage produced by said regulating machine and to control the time phase of this voltage, means responsive to the closing of the second mentioned switch for closing the third mentioned switch, means responsive to the closing of the third mentioned switch for effecting the operation of said commutator brush moving means, said brush moving means moving said commutator brushes at such a rapid rate during the transient period immediately following the closing of the third mentioned switch as to produce a safe interconnecting vector difference between the voltage induced in said primary winding and that of said source at sometime during this transient period while said motor is decelerating, and means responsive to the vector difference between the voltage induced in said primary winding and that of said source for closing the first mentioned switch at sometime during the transient period when said safe interconnecting vector difference is not exceeded, the last mentioned means being sufficiently quick acting to effect this switch closing operation during said transient period.

7. In combination, an induction motor having relatively rotatably primary and secondary windings, said motor rotating at other than its synchronous speed while its primary winding is unenergized, means for impressing on said secondary winding an alternating voltage whose frequency equals the slip frequency of said rotating motor, and means responsive to the voltage induced in said primary winding for stopping the impressing of said slip frequency voltage on said secondary winding when this induced voltage exceeds a predetermined value and for reimpressing said slip frequency voltage on said secondary winding when this induced voltage decreases appreciably below said predetermined value.

8. In combination, an induction motor having relatively rotatable primary and secondary windings, a switch for connecting said primary winding to an alternating current source whose voltage is substantially equal to the normal operating voltage of said motor, voltage reducing means connected to said source, a switch for connecting said primary winding to said voltage reducing means for starting and accelerating the motor approximately to its synchronous speed with an acceptable inrush current to said primary winding, means for supplying an alternating voltage whose frequency equals the slip frequency of said rotating motor, connecting means between said slip frequency voltage supplying means and said secondary winding, a switch so connected that the closing thereof causes said slip frequency voltage producing means to impress a slip frequency voltage on said secondary winding, and means responsive to the voltage induced in said primary winding for opening the third mentioned switch when this induced voltage exceeds a predetermined value and for reclosing this switch when this induced voltage decreases appreciably below said predetermined value.

9. In combination, an induction motor having relatively rotatable primary and secondary windings, a switch for connecting said primary winding to an alternating current source whose voltage is substantially equal to the normal operating voltage of said motor, voltage reducing means connected to said source, a switch for connecting said primary winding to said voltage reducing means for starting and accelerating said motor approximately to its synchronous speed with an acceptable inrush current to said primary winding, a commutator type frequency changer energized from said source for supplying an alternating voltage whose frequency equals the frequency of said rotating motor, a commutator type regulating machine having exciting windings energized by said frequency changer, connecting means between said regulating machine and said secondary winding, a switch interposed between said frequency changer and said source, said frequency changer and regulating machine being arranged to impress on said secondary winding a slip frequency voltage whose magnitude and time phase during the transient period immediately following the closing of the third mentioned switch are such as to produce a safe interconnecting vector difference between the voltage induced in said primary winding and that of said source at sometime during this transient period while said motor is decelerating, and means responsive to the voltage induced in said primary winding during said transient period for opening the third mentioned switch when this induced voltage exceeds the normal operating voltage of the motor by a predetermined amount and for reclosing this switch when the difference between this induced voltage and the normal operating voltage of the motor is less than said predetermined amount, the last mentioned means being sufficiently quick acting to effect these switch opening and closing operations during said transient period.

10. In combination, an induction motor having relatively rotatable primary and secondary windings, an alternating current source whose voltage is substantially equal to the normal operating voltage of said motor, an alternating current source whose voltage is materially lower than the normal operating voltage of said motor, a switch for connecting said primary winding to the last mentioned source for starting and accelerating said motor approximately to its synchronous speed with an acceptable inrush current to said primary winding, means for impressing on said secondary winding an alternating voltage whose frequency equals the slip frequen y of said motor and whose magnitude is such as to produce a safe interconnecting vector difference between the voltage induced in said primary winding and the voltage of said source while the motor is decelerating, means responsive to the voltage of the first mentioned source and the voltage induced in said primary winding for indicating the vector difference between these two voltages and the time phase relationship therebetween, and a switch for connecting said primary winding to the first mentioned alternating current source.

11. The method of connecting the primary winding of a wound secondary induction motor to an alternating current source when the motor is running at other than its synchronous speed, which comprises suddenly impressing on its secondary winding an alternating voltage whose frequency equals the slip frequency of the rotating motor and whose magnitude and time phase during the transient period immediately following the initial slip frequency energization of the secondary winding are such as to produce a safe interconnecting vector difference between the voltage induced in the motor primary winding and that of the alternating current source at sometime during this transient period, and impressing the voltage of the alternating current source on the motor primary winding at sometime during this transient period when said safe interconnecting vector difference is not exceeded.

12. The method of connecting the primary winding of a wound secondary induction motor to an alternating current source when the motor is running at other than its synchronous speed, which comprises impressing on its secondary winding an alternating voltage whose frequency equals the slip frequency of the rotating motor, increasing the magnitude of the impressed slip frequency voltage so rapidly during the transient period immediately following the initial slip frequency energization of the motor secondary winding and so controlling the time phase of this impressed slip frequency voltage current source as to produce a safe interconnecting vector difference between the voltage induced in the motor primary winding and that of the alternating current source at some time during this transient period, and impressing the voltage of the alternating current source on the motor primary winding at sometime during this transient period when said safe interconnecting vector difference is not exceeded.

13. The method of starting the operation of a wound secondary induction motor from an alternating current source whose voltage is substantially equal to the normal operating voltage of the motor, which comprises impressing on the motor primary winding an alternating voltage whose magnitude is materially lower than the normal operating voltage of the motor to start the latter and accelerate it approximately to its synchronous speed with an acceptable inrush current to the motor primary winding, removing the subnormal alternating voltage impressed on the motor primary winding, suddenly impressing on the secondary winding of the motor while the latter is decelerating an alternating voltage whose frequency equals the slip frequency of the rotating motor and whose magnitude and time phase during the transient period immediately following the initial slip frequency energization of the motor secondary winding are such as to produce a safe interconnecting vector difference between the voltage induced in the motor primary winding and that of the alternating current source at some time during this transient period, and impressing the normal operating voltage of the motor from the alternating current source on the motor primary winding at sometime during the transient period when said safe interconnecting vector difference is not exceeded.

14. The method of starting the operation of a wound secondary induction motor from an alternating current source whose voltage is substantially equal to the normal operating voltage of the motor, which comprises impressing on the motor primary winding an alternating voltage whose magnitude is materially lower than the normal operating voltage of the motor to start the latter and accelerate it approximately to its synchronous speed with an acceptable inrush current to the motor primary winding, removing the subnormal alternating voltage impressed on the motor primary winding, impressing on the secondary winding of the motor while the latter is decelerating an alternating voltage whose frequency equals the slip frequency of the rotating motor, increasing the magnitude of the impressed slip frequency voltage so rapidly during the transient period immediately following the initial slip frequency energization of the motor secondary winding and so controlling the time phase of the impressed slip frequency voltage as to produce a safe interconnecting vector difference between the voltage induced in the motor primary winding and that of the alternating current source at sometime during this transient period, and impressing the normal operating voltage of the motor from the alternating current source on the motor primary winding at sometime during this transient period when said safe interconnecting vector difference is not exceeded.

15. The method of connecting the primary winding of a wound secondary induction motor to an alternating current source when the motor is running at other than its synchronous speed, which comprises suddenly impressing on its secondary winding an alternating voltage whose frequency equals the slip frequency of the rotating motor and whose magnitude and time phase during the transient period immediately following the initial slip frequency energization of the secondary winding are such as to produce a safe interconnecting vector difference between the voltage induced in the motor primary winding and that of the alternating current source at sometime during this transient period, stopping the impressing of slip frequency voltage on the motor secondary winding when the voltage induced in the motor primary winding during the transient period exceeds the voltage of the alternating current source by a predetermined amount, reimpressing the previously mentioned slip frequency voltage on the motor secondary winding when the difference between the voltage induced in the motor primary winding and the voltage of the alternating current source is less than said predetermined amount, and impressing the voltage of the alternating current source on the motor primary winding at sometime during the transient period when said safe inter-connecting vector difference is not exceeded.

16. The method of inducing an alternating voltage of a predetermined magnitude in the primary winding of a wound secondary motor rotating at other than its synchronous speed without its primary winding being energized, which comprises impressing on its secondary winding an alternating voltage whose frequency equals the slip frequency of the rotating motor, and increasing the magnitude of the impressed slip frequency so rapidly during the transient period immediately following the initial slip frequency energization of the motor secondary winding as to produce a slip frequency magnetizing flux in the motor during this transient period which will induce said predetermined alternating voltage in the motor primary winding at some instant during this transient period.

PERCY W. ROBINSON.